(12) United States Patent
Reitz et al.

(10) Patent No.: US 10,051,871 B2
(45) Date of Patent: Aug. 21, 2018

(54) SYSTEM FOR TRANSPORTING SAUSAGES

(75) Inventors: Jürgen Reitz, Eschborn (DE); Manfred Waldstädt, Mainz (DE)

(73) Assignee: Poly-Clip System GMBH & Co. KG, Hattersheim (DE)

( * ) Notice: Subject to any disclaimer, the term of this patent is extended or adjusted under 35 U.S.C. 154(b) by 1180 days.

(21) Appl. No.: 12/896,836

(22) Filed: Oct. 1, 2010

(65) Prior Publication Data

US 2011/0079153 A1    Apr. 7, 2011

(30) Foreign Application Priority Data

Oct. 2, 2009    (EP) .................................... 09012521

(51) Int. Cl.
| | |
|---|---|
| *A23B 4/03* | (2006.01) |
| *A23B 4/044* | (2006.01) |
| *B60H 3/00* | (2006.01) |
| *B65G 29/00* | (2006.01) |
| *B65G 47/84* | (2006.01) |
| *A22C 11/00* | (2006.01) |
| *A22C 15/00* | (2006.01) |

(52) U.S. Cl.
CPC ................................. *A22C 15/001* (2013.01)

(58) Field of Classification Search
CPC ..... A22C 15/001; A23B 4/052; A23B 4/0523; B65G 47/61; B29C 33/36
USPC ....... 99/482; 198/486.1, 486.6, 479.1, 487.1, 198/760, 468.6; 452/48, 51, 53, 30
See application file for complete search history.

(56) References Cited

U.S. PATENT DOCUMENTS

| | | | | |
|---|---|---|---|---|
| 2,824,318 A | * | 2/1958 | Marzolf | ......................... 15/3.13 |
| 3,819,032 A | * | 6/1974 | Preuss | .................... B41F 35/00 |
| | | | | 118/70 |

(Continued)

FOREIGN PATENT DOCUMENTS

| | | |
|---|---|---|
| DE | 2818024 A1 | 11/1979 |
| DE | 3437830 A1 | 4/1986 |

(Continued)

OTHER PUBLICATIONS

Translated abstract of DE 38 06 467, Positioning Device, Sep. 6, 1989, Espacenet.*

(Continued)

*Primary Examiner* — Dana Ross
*Assistant Examiner* — Kuangyue Chen
(74) *Attorney, Agent, or Firm* — Fitch, Even, Tabin & Flannery LLP

(57) ABSTRACT

A system for storing products, in particular sausages, each having a sausage-shaped body and a loop (22), which is fixed to the sausage-shaped body and being used for a pendulously storage of the products (20) on rod-shaped storage devices (50). The System includes at least one rod-shaped storage device (50) for storing several products (20) by their loops (22) one after another. The system also includes at least one conveyor device (30) with at least one conveyor element (40) for conveying the products (20) by means of their loops (22) to storage places on the rod-shaped storage device (50). Furthermore, the system includes at least one damping unit (70, 170) for reducing a swinging motion of the products (20) is positioned at least partially along the rod-shaped storage device (50) such that it abuts on the products (20).

16 Claims, 6 Drawing Sheets

(56) References Cited

U.S. PATENT DOCUMENTS

| | | | |
|---|---|---|---|
| 4,033,099 A * | 7/1977 | Friedel et al. | 56/327.1 |
| 4,084,294 A * | 4/1978 | Dohrendorf | 452/135 |
| 4,757,669 A * | 7/1988 | Areblom et al. | 53/512 |
| 4,853,166 A * | 8/1989 | Andersen et al. | 264/46.5 |
| 5,671,838 A * | 9/1997 | Bowman | B65G 45/18 |
| | | | 198/496 |
| 6,213,368 B1 * | 4/2001 | Vermeer | A22C 11/0245 |
| | | | 226/104 |
| 8,333,273 B2 * | 12/2012 | Kleynen | B65G 21/2054 |
| | | | 198/525 |
| 2009/0047885 A1 * | 2/2009 | Liermann | A22C 15/001 |
| | | | 452/51 |

FOREIGN PATENT DOCUMENTS

| | | | |
|---|---|---|---|
| DE | 8625826 U1 | | 1/1987 |
| DE | 38 06 467 C1 | | 5/1989 |
| DE | 10012611 A1 | * | 9/2001 |
| DE | 102005054210 A1 | | 5/2007 |
| DE | 10 2006 054 039 A1 | | 5/2008 |
| EP | 0 107 148 A1 | | 5/1984 |
| EP | 0413166 A1 | | 2/1991 |
| EP | 0424675 A1 | | 5/1991 |
| EP | 0552421 A1 | | 7/1993 |
| EP | 1 891 858 A1 | | 2/2008 |
| EP | 1 985 185 A1 | | 10/2008 |
| FR | 2663418 A1 | | 12/1991 |
| WO | 0027212 A1 | | 5/2000 |
| WO | 20000027212 A1 | | 5/2000 |

OTHER PUBLICATIONS

EP 1 985 185 A1—English abstract and machine translation obtained from Espacenet (http://worldwide.espacenet.com) accessed on Apr. 23, 2012, 10 pages.

Opposition writ filed in corresponding European Pat. No. 2 305 042 dated Jan. 9, 2014 (16 pages).

EP 09012521.2-2313 Extended European Search Report dated Feb. 10, 2010, 5 pages.

EP 1 985 185 A1—English abstract and machine translation obtained from Espacenet (http://worldwide.espacenet.com) dated Apr. 23, 2012, 10 pages.

\* cited by examiner

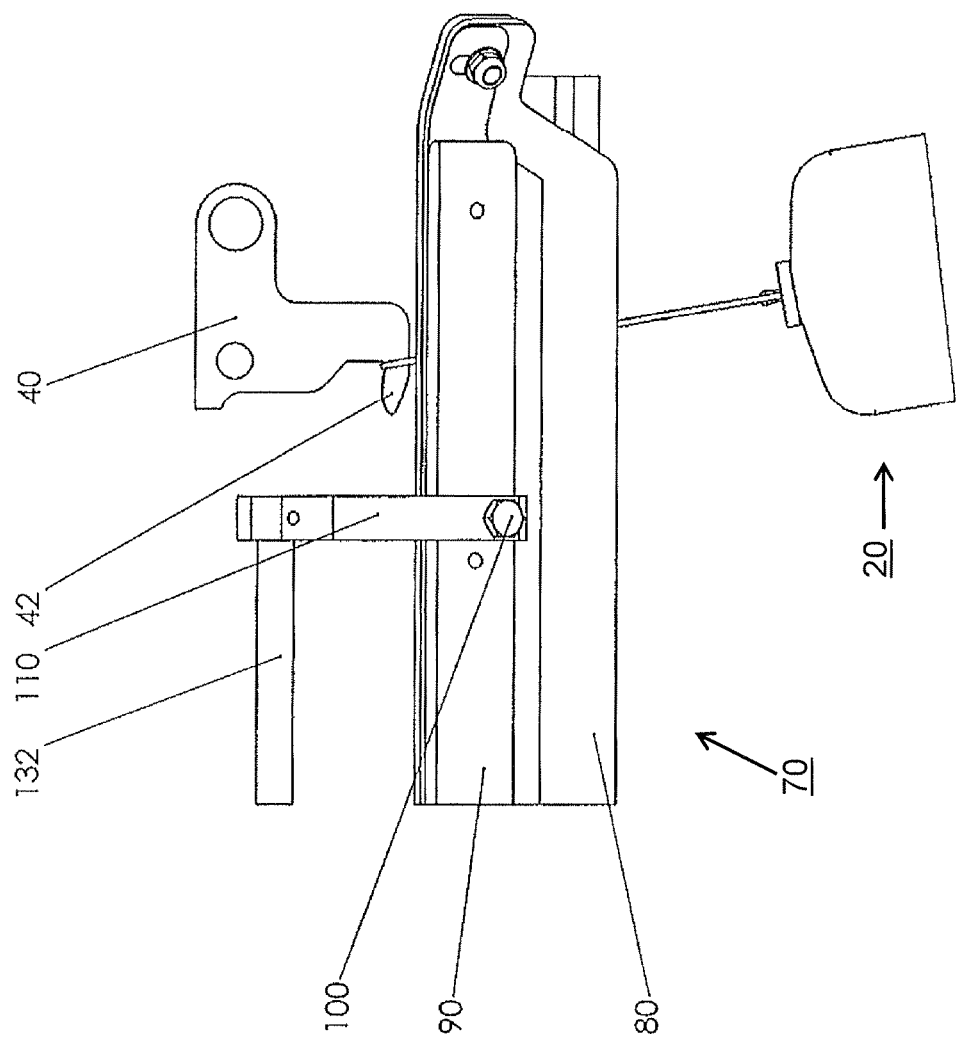

SYSTEM FOR TRANSPORTING SAUSAGES

This patent application claims priority to and the benefit of European patent application EP 09 012 521.2-2313, filed Oct. 2, 2009, which is hereby incorporated herein by reference.

The invention relates to a system for storing products, in particular sausages, each having a sausage-shaped body and a loop being fixed to the sausage-shaped body and being used for a pendulously storage of the products on rod-shaped devices. The system comprises at least one rod-shaped storage device for storing several products with their loops one after another. Beyond that, the system further comprises at least one conveyor device with at least one conveyor element for conveying the products by means of their loops to their storage places on the rod-shaped storage device.

As is known, it is the usual practice in sausage production, using for example an automatic clipping machine, for the filling of a sausage-shaped product which is to be formed by means of a filling tube into a flexible packaging material which is closed at the first end of the sausage product by closure means, referred to as clips. After the filling operation is concluded, a gathered braid portion, which is free of filling material, is formed by two displacer means. Two more clips are then applied with a certain distance to each other to that braid portion, in order to close the packaging material on both sides of the braid portion. Thereafter that portion is severed therebetween creating one complete sausage product and placing the first clip on the packaging material for the next sausage product to be filled. If the sausage product is later to be hung up for example for the purposes of smoking or storing, a loop for suspension is fed thereto in such a way that, when the clip is fitted, it is embraced by the clip and is thus secured to the sausage product.

The term loops in accordance with this invention is used to denote all at least partially flexible means, by way of which articles can be hung up.

After the filling process, the sausage products are subjected to further processing for example in a smoking chamber. For that purpose, the sausage products have to be transported to the end of the conveyor of the clipping machine and there taken over by the automatic hanging line, in which the sausage products are hung up individually and separately at their loops in such a way that as far as possible they do not touch each other. EP 1 985 185 contains means of which the loops, from which the products are hanging, are automatically and securely caught by the pick-up means which for example are in the form of a hook.

Within the automatic hanging line, the sausage products, hanging from their loops, are transported horizontally by means of a conveyor device onto a smoking bar forming a storage device. Usually the conveyor device comprises an electrical chain drive, at which individual hooks forming conveyor elements, are arranged for picking up the loops at one end of the automatic hanging line. The hooks are dragging the products to their predetermined storage place. The sausage products are being brought onto the storage device with a relative high velocity and then stopped suddenly when reaching their storage place. The fact that the sausage products are only one-sidedly suspended, i.e. at the top, and that they can posses a large mass, results in a rather high inertia of the sausage products.

The sudden stop from a high velocity and their high inertia may cause the sausage products to swing rather heavily on their loops once set into pendulum motion, causing them to clash either into each other or into nearby machine parts. In some cases the swinging goes even higher when the sausage products are bumping into each other in phase, resulting almost in resonance. Sometimes, this could cause the sausage products to be partially or completely ripped off their loops, or could cause the packaging material of the sausage products to burst open. Both cases can result inevitable in notable damages to the sausage products, which lead to outcast and unnecessary costs.

The object of the present invention is to solve the above described problem by means of a system with the features of independent claim 1 of the present invention.

What is proposed, in particular, is a system for storing products, in particular sausage products, each having a sausage-shaped body and a loop being fixed to the sausage-shaped body and being used for a pendulously storage on a rod-shaped storage device. The system comprises at least one rod-shaped storage device for storing several products on their loops one after another. Also, the system contains at least one conveyor device with at least one conveyor element for conveying the products by means of their loops to their storage places on the rod-shaped storage device.

Also, a damping unit is provided for reducing the swinging motion of the products. The damping unit is positioned at least partially along the rod-shaped storage device such that it at least abuts on the products. Thus, the product is sliding along the damping unit creating a frictional force between the product and the damping unit.

It is also possible that the damping unit extends into the path of motion of the product and thereby combing through the damping unit in order to form a positive locking between the product and the damping unit.

By either means, a damping effect is created reducing the swinging motion of the products and consequently preventing the products from being damaged.

In another advantageous configuration the system is arranged in such a way that the damping unit is positioned approximately along the entire length of the storage device. This embodiment would have the advantage for the damping unit to have a damping effect everywhere along the whole storage device not to miss a loop or a sausage-shaped body when positioned in-between two partial damping units.

The damping unit can also be positioned such that it abuts on the loops of the products. Such an arrangement is advantageous for constructing a very compact storage system, as the rod-shaped storage device and the damping element, in form of bristles, are close together.

Beyond that it can be beneficial to position the damping unit in such a way that it abuts on the sausage-shaped body of the products, in order to provide greater damping effect on the product.

It is also possible, to position an additional damping unit parallel along the storage device and opposite the first damping unit, in order to further increase the damping effect upon the product. Beyond that, it is possible to position damping units such that they abut the loop as well as the sausage-shaped body of the product, in order to even further increase the damping effect.

It is also advantageous, that the damping unit is reversibly tiltable from an operating position, at which the damping unit abuts the product, to an inoperating position, at which the storage device is tilted away from the storage device. The inoperating position allows the rod-shaped storage device, with or without products hanging from it, to be brought into or taken out its storage support within the automatic hanging line.

For that purpose, the damping unit is attached to a support device, which again is linked to a pivot mechanism. The pivot mechanism functions as a hinge for the damping unit to be reversibly tiltable from an operating position to an inoperating position.

In another beneficial configuration, the damping unit has a two-dimensional extension defining a plane being arranged in an angle to the horizontal plane. The damping unit can be arranged by the pivot mechanism in such a way that its plane is facing upwards at an angle above a horizontal plane in its operating position or facing downwards at an angle below a horizontal plane in its inoperating position. This position enables the damping unit to be more bendable and to act upon the products with a greater damping surface, in order to increase its damping effect.

Since the length of the loops as well as the length of the loops and the sausage-shaped body can differ, it is also advantageously for the damping unit to be adjustable in its vertical height, in order to be adaptable to its most effective position.

The damping unit comprises at least one holding element and at least one damping element. The holding element is holding the damping element. A number of varieties are likely to affix the damping element at the holding element, for example clamping, gluing or by means of fasteners, such as screws or bolts.

In order to provide a damping element that is relatively cheap, easy to handle and commonly available in a great range of bending properties and flexibility, it is advantageous to form the damping element as bristles.

Also, the damping element can be shaped out of at least one soft-plastic lip, for example silicone. This configuration is advantageous in the aspect of being more durable and easier to clean than a brush or rather the bristles.

The damping unit is attached with its holding element within the storage system by a support device, in order to place the damping unit in various positions relative to the rod-shaped storage device. The damping unit can be positioned on either side and also on both sides of the rod-shaped storage device.

Various shapes and forms are possible to form the storage device, not just rod-shaped forms. For example, the storage device can be shaped as a smoking bar. The cross-sectional area of the storage device can have various shapes, for example round or polygonal.

In order to transport the products to their predetermined position at the storage device, conveyor elements featuring hooks in an advantageous configuration to catch the loops and thereon conveying the products to their storage places and releasing them onto the rod-shaped storage device. The hooks can be shaped in various forms, such as single or double hooks.

Other advantages and two embodiments of the present invention shall now be described with reference to the attached drawings. The terms "top", "bottom", "left" and "right" used when describing the embodiment relate to the drawings oriented in such a way that the reference numerals and name of the figures can be read normally.

In the drawings,

FIG. 4 shows a schematic side view of the inventive storage system with a damping element in form of a plastic lip fitted on one side to the holding element;

The embodiments of the inventive storage system described in the following are used within automatic hanging lines for the production of sausage products. The inventive storage system may also be used, of course, in production of sausage-shaped products that are not foodstuffs, but for example, sealing compound or adhesive.

Figure 1:
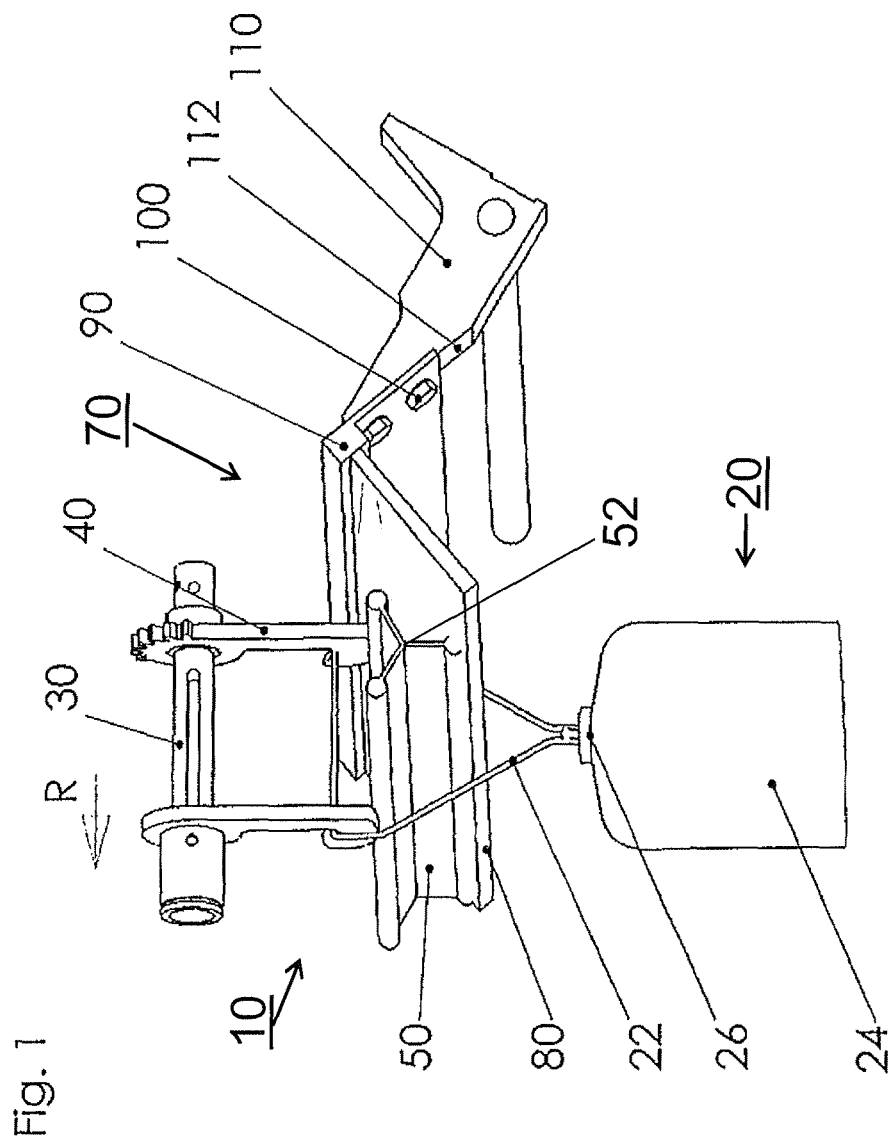
FIG. 1 shows a schematic perspective view of a first embodiment of the inventive storage system with a damping element in form of a brush acting upon the loop.
Figure 2:
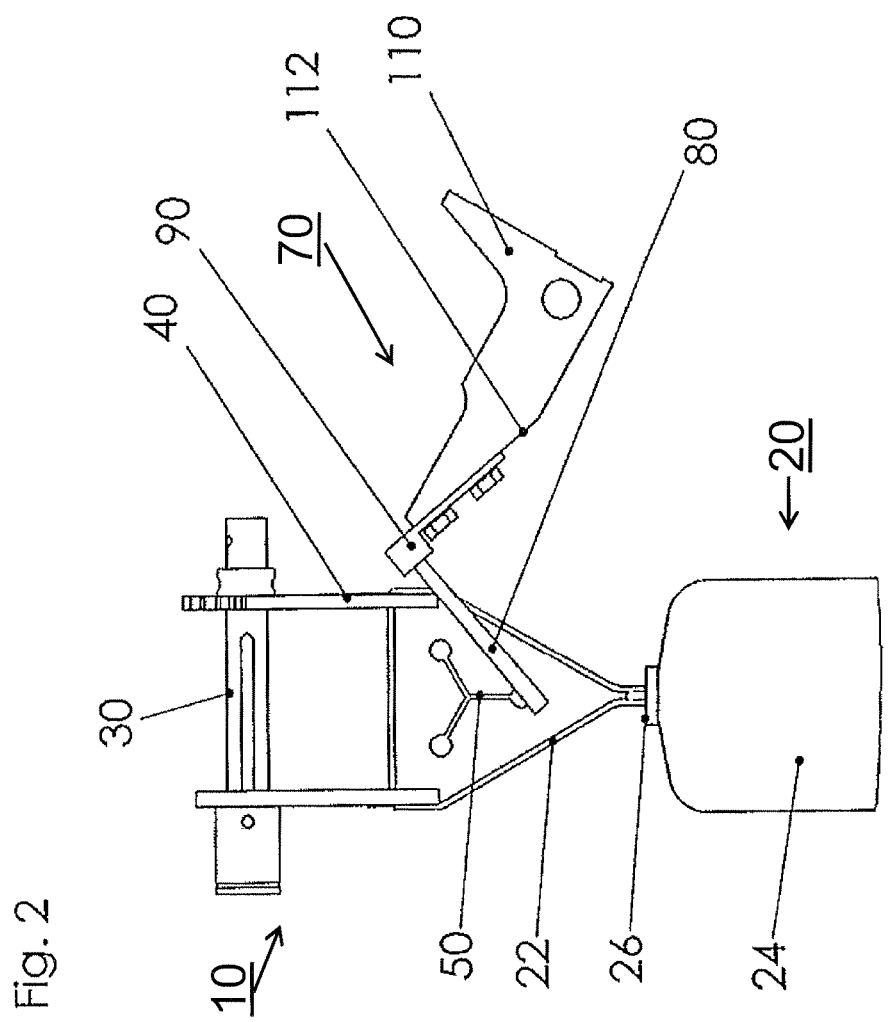
FIG. 2 shows a schematic front view of a first embodiment of the inventive storage device with a damping unit in form of a brush acting upon the loop.
Figure 6:
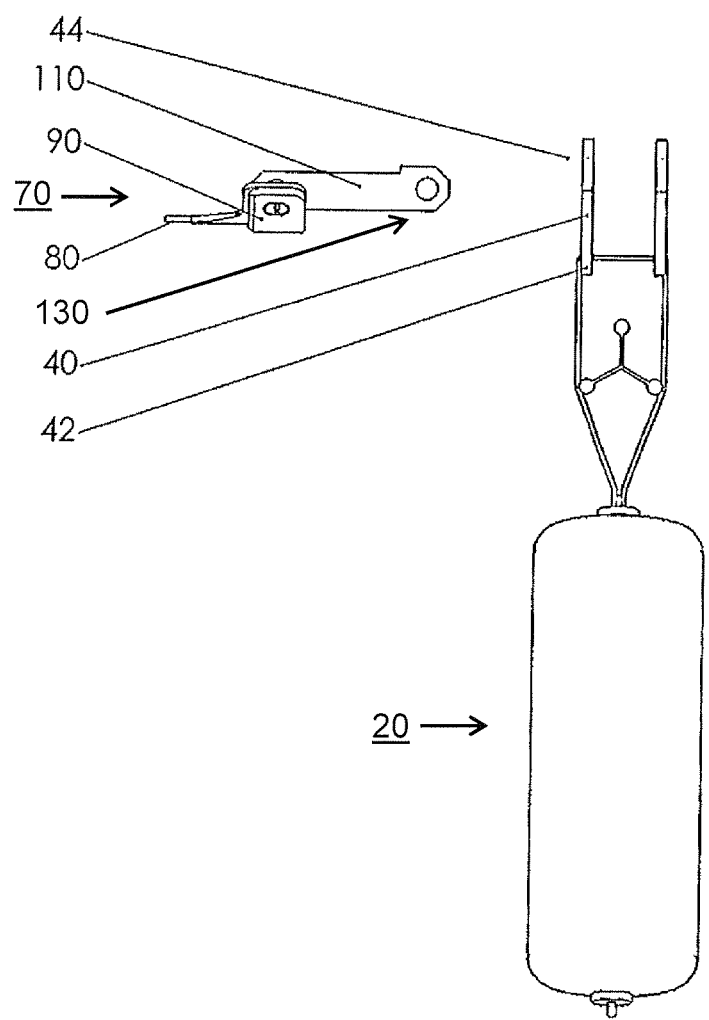
FIG. 6 shows a schematic side view of the inventive storage system with a damping unit tilted in its inoperating position.

FIG. 1 and FIG. 2 show a schematic perspective and front view of the inventive storage system 10 according to a first embodiment. The storage system 10 comprises a longitudinal storage device 50 in form of a three-spoke smoking bar. However, numerous shapes and cross-sections are possible for the smoking bar. The storage device 50 is connected at one end to a storage support 60 (not shown), allowing the storage device 50 to be arranged horizontally and leaving a free and unattached receiving end 52 for the storage device 50. The receiving end 52 of the storage device 50 ends roughly at the entry of the automatic hanging line. A conveyor device 30 comprises several conveyor elements 40, which are driven by an endless chain (not shown) within the storage system 10. The conveyor element 40 features two parallel hooks with horizontal tines 42 (shown in FIG. 3b and FIG. 6) facing in direction R and parallel to the storage device 50. The distance between the two tines 42 is roughly equal to the diameter of the storage device 50. The conveyor element 40 is located above the storage device 50. The loop 22 of the product 20 is hooked into the tines 42 of the conveyor element 40 and also encircles the storage device 50. The lower end of the loop 22 is connected to the sausage-shaped body 24 of the product 20 by the clip 26. The sausage-shaped body 24 is therefore hanging from the loop 22. The damping unit 70, 170 is positioned in its operating position abutting on the product 20. The damping unit 70, 170 comprises the damping element 80 in form of bristles. The damping element 80 is attached by gluing onto the holding element 90, which is in a roughly 90° orientation towards the damping element 80. The holding element 90 and the damping element 80 are forming together the damping unit 70, 170. The damping unit 70, 170 is positioned in its longitudinal extension parallel to the storage device 50. The holding element 90 is again attached to a support device 110. The support device 110 is shaped as a longitudinal lever with a tapered surface 112 at which the holding element 90 is connected to by bolts 100. The lower end of the support device 110 can be connected to a pivot mechanism 130 (as shown in FIG. 6) acting as a hinge. The pivot mechanism 130 enables the support device 110 and consequently the entire damping unit 70, 170 to be tiltable between an operating position, when the damping unit 70, 170 abuts the product 20 and an inoperating position when the damping unit 70, 170 is hinged away from the product 20 and the storage device 50.

When the sausage products have reached the end of the clipping machine after having been filled, the sausage products 20 are being brought into an upright position, as they are being hung upon their loops. The sausage products 20 are being transported to the automatic hanging line, at which the conveyor elements 40 of the conveyor device 30 are receiving the products 20, by hooking the tines 42 into the loops 22. The loops 22 are being threaded around the storage device 50. The products 20 are then dragged along the storage device 50 in direction R by means of the conveyor elements 40 to their predetermined storage place on the storage device 50. As soon as the conveyor elements 40 have received the products 20, the damping unit 70, 170 is acting upon the products 20, in order to reduce the swinging of the products 20 to an absolute minimum right from the beginning of the charging process onto the automatic hanging line.

Figure 3B:
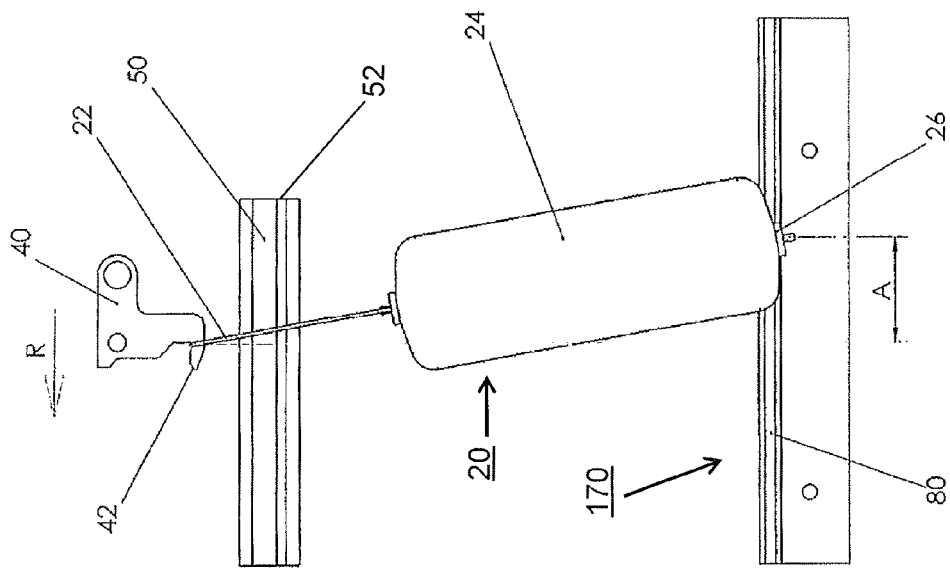
FIG. 3b shows a schematic front view of a second embodiment of the inventive storage system with a storage device, a hook and two damping units acting upon two sides of the sausage-shaped body.
Figure 3A:
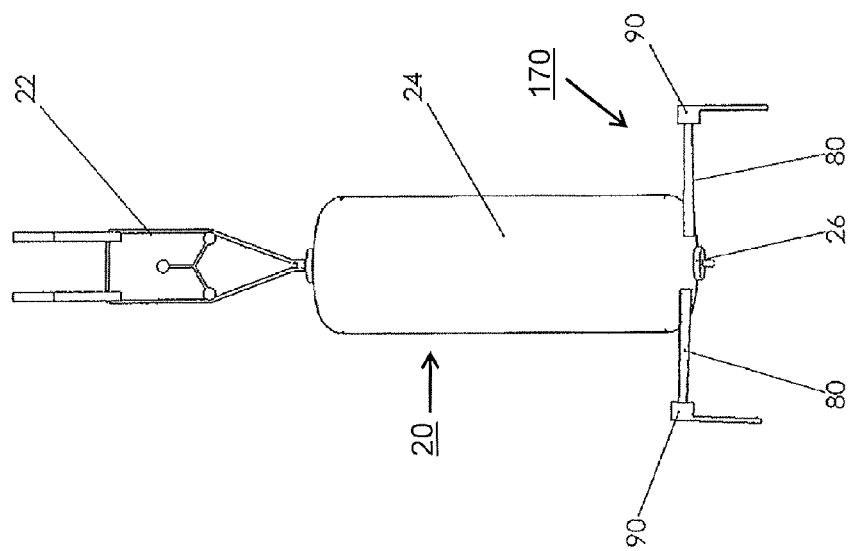
FIG. 3a shows a schematic side view of a second embodiment of the inventive storage system with a storage device, a hook and damping unit acting upon the sausage-shaped body.

A second embodiment is illustrated in FIG. 3a and FIG. 3b showing a schematic front and side view of the storage system 10. This embodiment functions and is assembled similar to the above described embodiments. However, here the damping unit 70, 170 is placed in a lower position relative to the storage device 50 and is acting upon the sausage-shaped body 24 of the product 20. Two damping units 70, 170 are provided parallel to the storage device 50 and opposite to each other. The two damping units 70, 170 are in a horizontal orientation and level to each other. The distance of the outer ends 82 of the damping elements are not further apart from each other than the diameter of the sausage-shaped body 24 at the position the damping units 70, 170 are acting upon.

FIG. 3b shows a side view of the inventive storage system 10 according to the second embodiment. Again, the storage device 50 is shaped as a longitudinal horizontal smoking bar. The conveyor element 40, as part of the conveyor device 30, is in form of a hook with horizontal tines 42 positioned above and parallel to the storage device 50. The loop 22, at which the product 20 is hanging from, is resting upon the tines 42. The loop 22 and consequently the product 20 are pulled by the conveyor element 40 along the storage device 50. The product 20 is experiencing a force opposite to the direction of motion R when being brought into motion by the conveyor element 40, resulting in an amplitude A. The damping unit 70, 170 is positioned, as described before in a lower position and acting upon the sausage-shaped body 24. The damping unit 70, 170 has its greatest effect when positioned against the maximum amplitude of the swinging product 20. This is usually the point furthest away from the pivot of a pendulum.

Another embodiment of the inventive storage system 10 is shown in FIG. 4. The damping element 80 is in form of a single, relative flat, thin, rectangular sheet soft-plastic lip. It is also possible to form the lip out of several sheets of various shapes or even in form of bristles. One of the longitudinal edges of that damping element 80 is connected by fasteners 100, e.g. bolts, to the holding element 90, in form of a longitudinal metal plate. The holding element 90 is again connected by fasteners 100, e.g. bolts, to a support device 110. All the edges and positions of the damping element 80, which are or could be in contact with the product 20, have to be round, tapered or at least in such a condition not to harm or damage the product 20 in any way. It is also possible to add another, even softer material to the edges of the damping element 80 to prevent possible damages to the products 20.

Figure 5:
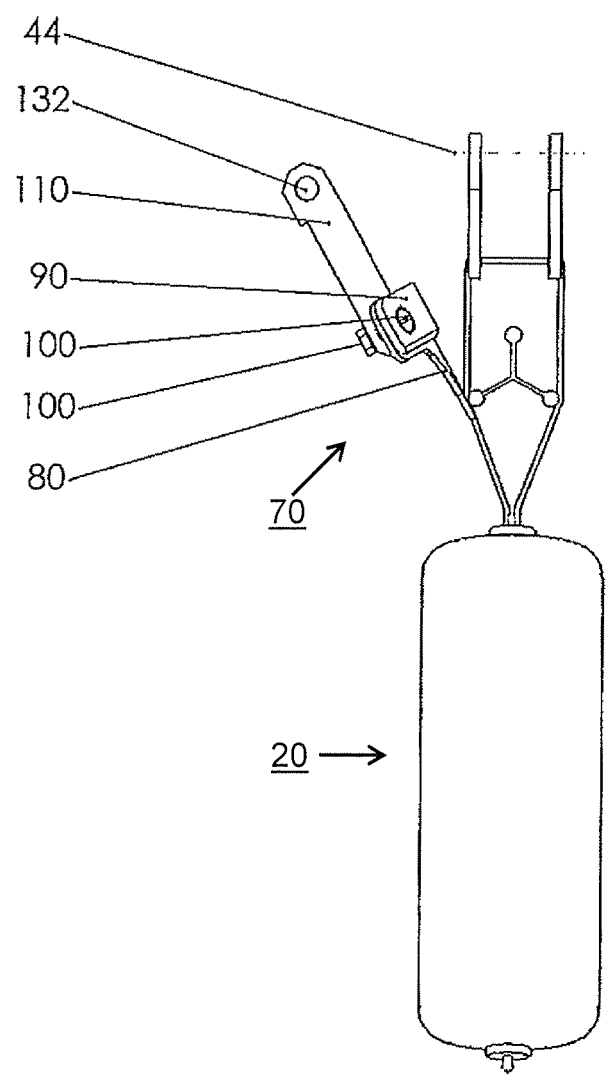
FIG. 5 shows a schematic side view of the inventive storage system 1 with a damping unit in its operating position.

FIGS. 5 and 6 demonstrate the inventive storage system 10 in its operating position and in its inoperating position, respectively. FIG. 5 shows the storage system 10 comprising the above described damping unit 70, 170 and the damping element 80, in form of a soft-plastic lip. The damping unit 70, 170 is connected as also described before by fasteners 100 to the support device 110, which again is connected to a pivot mechanism lever 132 of the pivot mechanism 130. When the storage system 10 is in its operating position, the damping unit 70, 170 abuts on the product 20 (not shown in FIG. 5).

FIG. 6 shows the same inventive storage system 10 with the same components as in FIG. 5. Two conveyor elements 40 are shown in form of double hooks with two horizontal tines 42, on which the loops 22 (not shown) could be hanging. When the conveyor element 40 has reached the predetermined storage place for the product 20, the conveyor element 40 is pivoted in opposite to direction R about pivot point 44. By doing so, the tines 42 are being moved from their horizontal orientation into a vertical orientation, which allows the loops 22 to slide off the tines 42 and fall onto the below storage device 50. The storage system 10 is in its inoperating position when the damping unit 70, 170 is hinged upwards and away from the storage device 50 and the products 20 (not shown in FIG. 6) by means of the pivot mechanism 130. The inoperating position allows the storage device 50 with or without products 20 hanging from it to be taken out of or brought into its storage support 60 (not shown).

It is also possible, even though not shown, that the damping unit 70, 170 can be positioned underneath the storage device 50 and the products 20. Also, it is possible to form the vertically adjustable damping element 80 in form of foam or an equivalent soft material. Beyond that, it is also possible to construct the damping unit 70, 170 as a medium, for example as granules or even a liquid, which is placed within a container underneath the storage device 50 and the sausage-shaped bodies 24 hanging into it.

LIST OF REFERENCE SIGNS

Storage system 10
Product 20
Loop 22
Sausage-shaped body 24
Clip 26
Conveyor device 30
Conveyor element 40
Tine 42
Pivot point 44
Storage device 50
Receiving end 52
Storage support 60
Damping unit 70, 170
Damping element 80
Damping element outer ends 82
Holding element 90
Fastener 100
Support device 110
Tapered surface 112
Pivot mechanism 130
Pivot mechanism lever 132
Direction R
Amplitude A

The invention claimed is:

1. System for storing products, each of the products having a sausage-shaped body and a loop being fixed to the sausage-shaped body and being used for a pendulous storage of each of the products on a rod-shaped storage device, the system comprising:

the rod-shaped storage device for storing the products by their loops one after another, and at least one conveyor device with at least one conveyor element for conveying the products along a conveyance path by their loops to storage places on the rod-shaped storage device, wherein at least one deformable damping unit adapted for reducing a swinging motion of each of the products by damping through deformation, the at least one deformable damping unit being positioned at least partially along the rod-shaped storage device such that it engages the products as each is conveyed along the conveyance path, where the at least one deformable damping unit is adapted to extend into the conveyance path of the products such that the products engage and deform the at least one deformable damping unit as each is conveyed along the conveyance path to reduce the swinging motion.

2. System according to claim 1, where the at least one deformable damping unit extends approximately along the entire length of the rod-shaped storage device.

3. System according to claim 1, where the at least one deformable damping unit is positioned such that it engages the loops of the products.

4. System according to claim 1, where the at least one deformable damping unit is positioned such that it engages the sausage-shaped body of the products.

5. System according to claim 1, where the at least one deformable damping unit is reversibly tiltable from an operating position to an inoperable position to grant access for introducing and removing the rod-shaped storage device into or from the system.

6. System according to claim 1, where the at least one deformable damping unit has a two-dimensional extension defining a plane being arranged in an angle to the horizontal plane.

7. System according to claim 1, where the at least one deformable damping unit is adjustable in its vertical height.

8. System according to claim 1, where the at least one deformable damping unit comprises at least one holding element and at least one damping element which engages the product.

9. System according to claim 8, where the at least one damping element comprises bristles.

10. System according to claim 8, where the at least one damping element comprises at least one soft-plastic lip, the at least one soft-plastic lip extending into the conveyance path from a side of conveyance path and extending partially across the conveyance path and partially across a width of each of the products.

11. System according to claim 10 further comprising:
a second deformable damping unit to form a pair of deformable damping units, the second deformable damping unit being adapted to extend into the conveyance path of the products such that the products deform the second deformable damping unit to reduce the swinging motion, the second deformable damping unit arranged opposite the at least one deformable damping unit, where the pair of deformable damping units are arranged opposite each other on opposite sides of the conveyance path.

12. System according to claim 10, where the at least one soft-plastic lip generally extends longitudinally in a direction substantially parallel with the conveyance path of the product.

13. System according to claim 1, where the at least one deformable damping unit is attachable to the system by a support device.

14. System according to claim 1, where the rod-shaped storage device is a smoking bar.

15. System according to claim 1, where the at least one conveyor element features a hook for catching the loops of the products and conveying the products by their loops to their storage places.

16. System according to claim 1 further comprising:
a second deformable damping unit to form a pair of deformable damping units, the second deformable damping unit being adapted to extend into the conveyance path of the products such that the products deform the second deformable damping unit to reduce the swinging motion, the second deformable damping unit arranged opposite the at least one deformable damping unit, where the pair of deformable damping units are arranged opposite each other on opposite sides of the conveyance path.

* * * * *